United States Patent [19]

Walker

[11] 3,864,524

[45] Feb. 4, 1975

[54] ASYNCHRONOUS MULTIPLEXING OF DIGITIZED SPEECH

[75] Inventor: Neil Edward Walker, Tampa, Fla.

[73] Assignee: Electronic Communications, Inc., St. Petersburg, Fla.

[22] Filed: Mar. 2, 1973

[21] Appl. No.: 337,663

Related U.S. Application Data

[63] Continuation of Ser. No. 85,671, Oct. 30, 1971, abandoned.

[52] U.S. Cl. .......................... 179/15 BA, 179/15 AS

[51] Int. Cl. .............................................. H04j 3/16

[58] Field of Search ....... 179/15 BA, 15 AS, 15 BV, 179/18 FF; 325/38 B

[56] References Cited

UNITED STATES PATENTS

| | | | |
|---|---|---|---|
| 3,303,475 | 2/1967 | Hellerman | 179/15 BA |
| 3,306,979 | 2/1967 | Ingram | 179/15 BA |
| 3,432,684 | 3/1969 | Michael | 307/223 R |
| 3,500,441 | 3/1970 | Brolin | 325/38 B |
| 3,548,203 | 12/1970 | Basse | 307/223 R |
| 3,641,273 | 2/1972 | Herold | 179/15 BA |
| 3,644,680 | 2/1972 | Amano | 179/15 AS |
| 3,811,014 | 5/1974 | Seitz | 179/15 AS |

FOREIGN PATENTS OR APPLICATIONS

| | | | |
|---|---|---|---|
| 1,108,462 | 4/1968 | Great Britain | 179/15 AL |

*Primary Examiner*—David L. Stewart
*Attorney, Agent, or Firm*—Hopgood, Calimafde, Kalil, Blaustein & Lieberman

[57] ABSTRACT

Digitized multiplexing is effected by a variable rate asynchronous multiplexer, the sampling rate for each modulation being a function of the number of talkers at any given instant. Means are disclosed for continuously monitoring the number of talkers and utilizing the information obtained to divide this number into the total data rate to thereby effect a sample rate which is variable per channel but constant for the system or channel group.

4 Claims, 8 Drawing Figures

INVENTOR.
NEIL EDWARD WALKER
BY
Sandoe, Hopgood & Calimafde
ATTORNEYS

INVENTOR.
NEIL EDWARD WALKER
BY
Sandoe, Hopgood & Calimafde
ATTORNEYS

INVENTOR.
NEIL EDWARD WALKER
BY
Sandoe, Hopgood & Calimafde
ATTORNEYS

INVENTOR.
NEIL EDWARD WALKER
BY
Sandoe, Hopgood & Calimafde
ATTORNEYS

INVENTOR.
NEIL EDWARD WALKER
BY
Sandoe, Hopgood & Calimafde
ATTORNEYS

ASYNCHRONOUS MULTIPLEXING OF DIGITIZED SPEECH

This application is a continuation of application Ser. No. 85,671 of similar title, filed on Oct. 30, 1971 now abandoned.

BACKGROUND OF THE INVENTION

This invention relates to a system for reducing the per channel bit rate required for a given quality of speech conversion and utilizes a method and apparatus which I have chosen to call VRAM, for variable rate asynchronous multiplexing.

Bandwidth considerations have long dominated the effectiveness and efficiency of communication systems. In order to make a more economical use of speech transmission media, several methods have been devised to reduce the bandwidth required to transmit a given speech information. One approach is to utilize the silent intervals that separate energy bursts in normal speech sounds. In prior art systems utilizing this approach, speech information is interpolated into the silent intervals so that greater information is carried in a given frequency bandwidth. Two examples of such systems for reducing transmission channel bandwidth by speech interpolation are described in A. E. Melhose, U.S. Pat. No. 2,541,932 issued Feb. 13, 1951 and R. Guenther, U.S. Pat. No. 2,870,260 issued Jan. 20, 1959. Generically, the systems are known under the name of T.A.S.I. for Time Assignment Speech Interpolation.

Common to the prior art bandwidth reduction systems of the type described in the above identified patents, is the interposition of an energy burst in the voice signal of one talker into a time coincident silent interval or hiatus in the voice signal of another talker. Since the time gaps per line side represent almost 60 percent of the available time, 50 percent while listening, and 10 percent between words and phrases, a number of transmission channels between two points may accommodate a significantly larger number of talkers. Speech interpolation systems therefor reduce the amount of bandwidth required to provide communication service between two points since in conventional speech transmission systems the number of talkers typically cannot exceed the number of channels. Alternatively, a smaller bandwidth per channel is effected by this type of system. It is evident, however, that in such speech interpolation arrangements, transmission economy is realized only during periods when the number of talkers exceeds the number of channels, for only in such periods are silent intervals utilized. This, however, simultaneously gives rise to momentary "freeze-out" where there is competition for available channels.

In another type of bandwidth reducing system, the bandwidth is reduced to each individual conversation rather than on a group basis so that the bandwidth is conserved regardless of the number of talkers at any instant. One of the earliest methods of reducing the bandwidth required to transmit a single conversation is disclosed in J. C. Steinberg, U.S. Pat. No. 1,836,824 issued Dec. 15, 1931. This invention is based upon the recognition that speech is composed of two basic types of sounds, vowels and consonants, and that a vowel speech sound has an energy spectrum in which substantially all the energy is transmitted by low frequency components while on the other hand a consonant has an energy spectrum in which substantially all the energy is transmitted by high frequency components. Because the two frequency sounds do not occur simultaneously, Steinberg provides for the separation of the two types of sounds on a time basis and bandwidth reduction is achieved by discarding the low frequency components of consonants and the high frequency components of vowels. Unfortunately, this system, while it is economical, results in the degradation of the quality of the speech being transmitted.

Another system for reducing bandwidth is disclosed in J. L. Flanagan, U.S. Pat. No. 3,158,693 issued Nov. 24, 1964 in which bandwidth reduction is predicated, like T.A.S.I., upon the fact that active speech bursts representing syllables and words occupy only a percentage of the total time and the remainder of what appears to be continuous speech is in fact silent intervals. In Flanagan, the bandwidth is reduced by dividing speech bursts into two frequency bands, low and high, transmitting one immediately and delaying the other, then reversing the process at the other end. This type of arrangement, however, often calls for discarding of portions of the frequency band which exceed the delay expectations, thereby degrading speech.

OBJECTS OF THE INVENTION

It is the object of this invention to obviate the foregoing defects in conventional systems of the type described.

It is a further object of this invention to overcome the high bandwidth requirement for digitalized voice channels by reducing the per channel bit rate required for a given quality of speech conversion.

It is a further object of this invention to provide an arrangement of the foregoing type which does not rely on a variation in the rate of transmission of intelligence, i.e., the rate of transmission of intelligence is constant for any channel.

It is a further object of this invention to accomplish the foregoing objects with an apparatus which is relatively simple, economical, and which is composed of conventional modules which are easily available.

Briefly, the variable rate asynchronous multiplexing technique according to the invention is unlike any of the aforementioned techniques and is predicated upon a characteristic of the human listener which heretofore has not been noted in this regard or effectively utilized. In the human ear, sound vibrations are assembled in the cartilaginous pinna, then funneled through air in the auditory canal. The eardrum is set into vibration, the mechanical coursing being transmitted through minute articulated bones to a window at the base of the cochlea, whereupon vibrations of the cochlea are converted into nervous impulses in the organ of Corti, a complex of sensory cells on the basilar membrane. Small vibrations can be detected when the fluid of the lagena shifts barely more than the diameter of a hydrogen atom.

The response characteristic of the human ear just described is such that upon hearing the filtered reconstruction of a waveform which has been sampled and digitized at a rate which varies rapidly, the ear/mind combination attributes a quality to the reconstructed waveform which is the approximate equivalent of the average of the different qualities associated with the different sampling rates.

The invention which shall be described herein utilizes this quality of the ear, resulting in a technique which is much less complex than the previously described systems and which achieves considerable bandwidth reduction for the transmission of digitized speech.

Aside from the more apparent economical advantages of the VRAM technique, the inventive system does not suffer from prior art deficiencies which interpolate speech pauses. Freeze-out or the clipping of words or phrases is a natural tendency of such systems and is obviated only at considerable expense in increased complexity. The instant system does not suffer from freeze-out, and words and phrases are never significantly clipped or discarded under load conditions. Consequently, VRAM achieves high quality performance in an uncomplex manner and hence is economical and advantageous over prior systems seeking to accomplish the same result.

To aid in understanding variable rate asynchronous multiplexing, consider an $n$ channel system with $n$ speakers engaged in conversation. Normally, as mentioned, only 40 percent of the time is actually spent by a speaker in verbalizing and requires conversion for transmission. The remaining 60 percent is occupied by pauses between the words and syllables, and by listening. Consequently, only $0.4n$ users are actually talking, on the average, at any given instant.

In a digitalized system, each user must have his speech converted into a digital format. In the VRAM speech system, the voice converters are not clocked at fixed rates but rather at varying rates changing sufficiently rapidly that the human ear and mind cannot detect the individual sampling rate but is aware only of the group or average quality. It has been found that a sample rate which changes at 1 millisecond intervals is beyond the comprehension of the ear/mind complex and is subject to averaging.

In the VRAM speech system, the sample rate for each modulator is a function of the number of talkers at any given instant. In a ten-channel system, there can be anywhere from zero to ten talkers, but the average number (from the formula delineated above) is four. When only one user is talking, his modulator is clocked at a rate equal to the total data rate divided by one. The data rate is the bits per second available for the digitized conversion of all grouped voice channels (in this case 10). If during a following instant there are eight talkers, then the sample rate for each of the corresponding eight modulators is the total data rate divided by eight.

As will be appreciated by those skilled in the art, in order to know which channels are in use, the channels are sampled at periodic intervals by signal sensing circuitry. As mentioned before, one millisecond intervals are sufficiently short to provide average quality. The same intervals are also sufficiently short to ensure that no significant speech information is lost between samples.

The above mentioned and other features and objects of this invention and the manner of attaining them will become more apparent and the invention itself will best be understood by reference to the following description of an embodiment of the invention taken in conjunction with the accompanying drawings, the description of which follows:

FIGS. 1*a* and 1*b* are block schematic diagrams illustrating, respectively, the VRAM transmitter and VRAM receiver according to one embodiment of the invention;

Figure 1A:
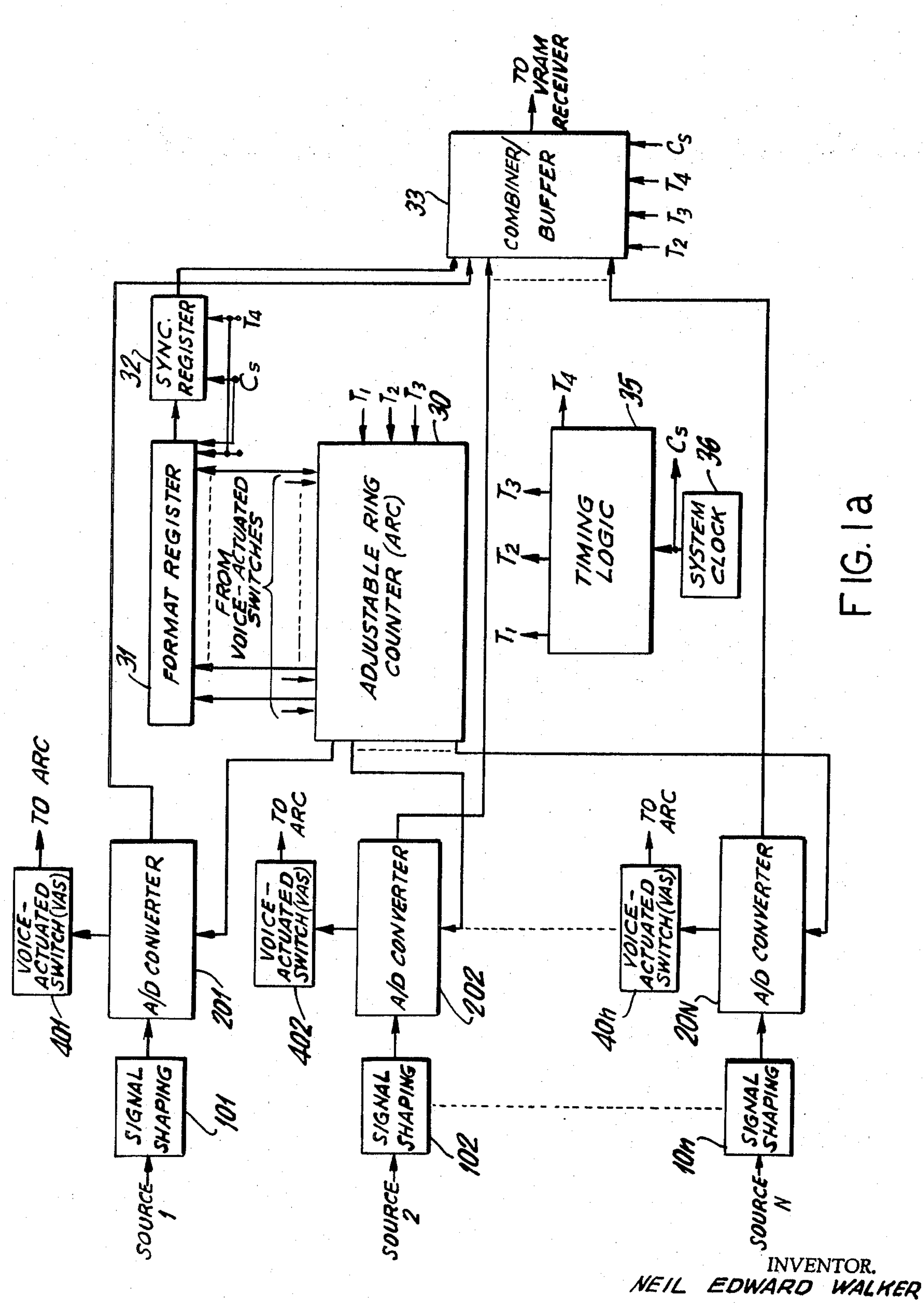
Figure 1B:
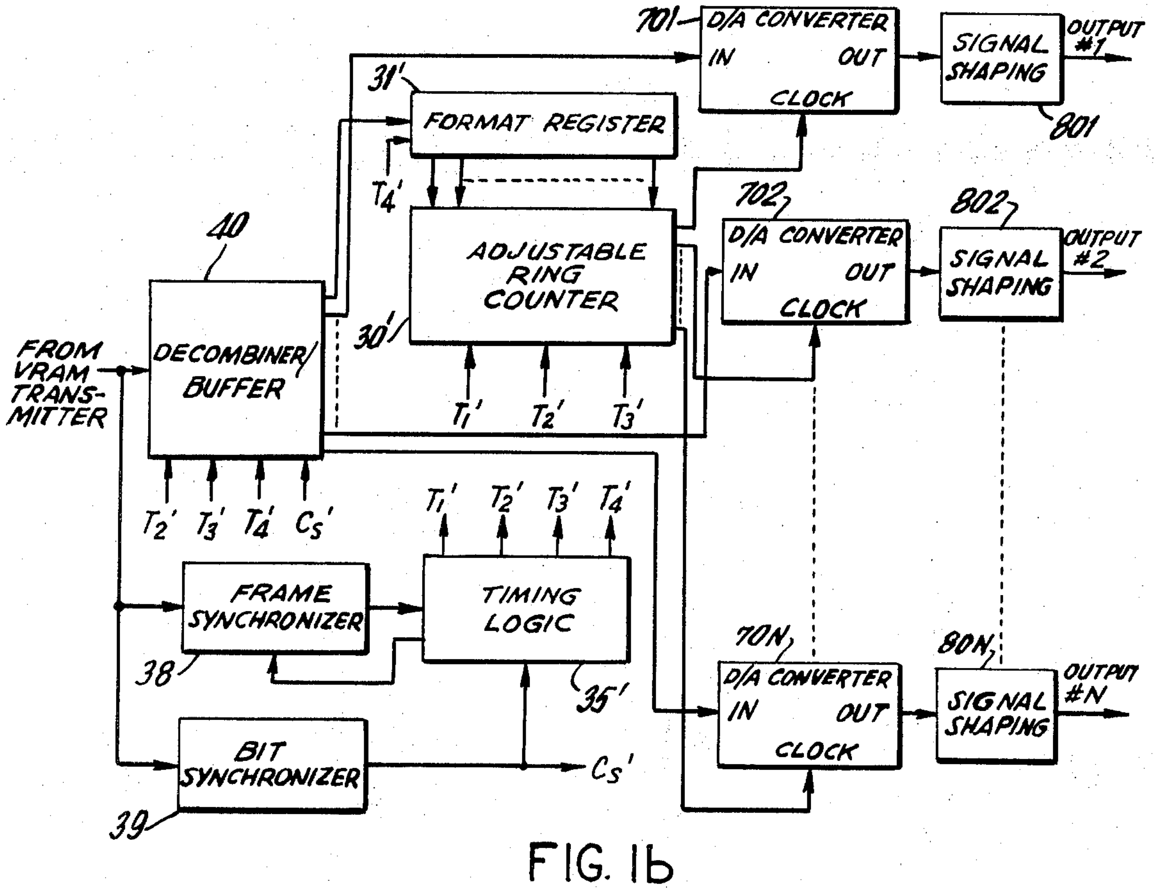
Figure 6:
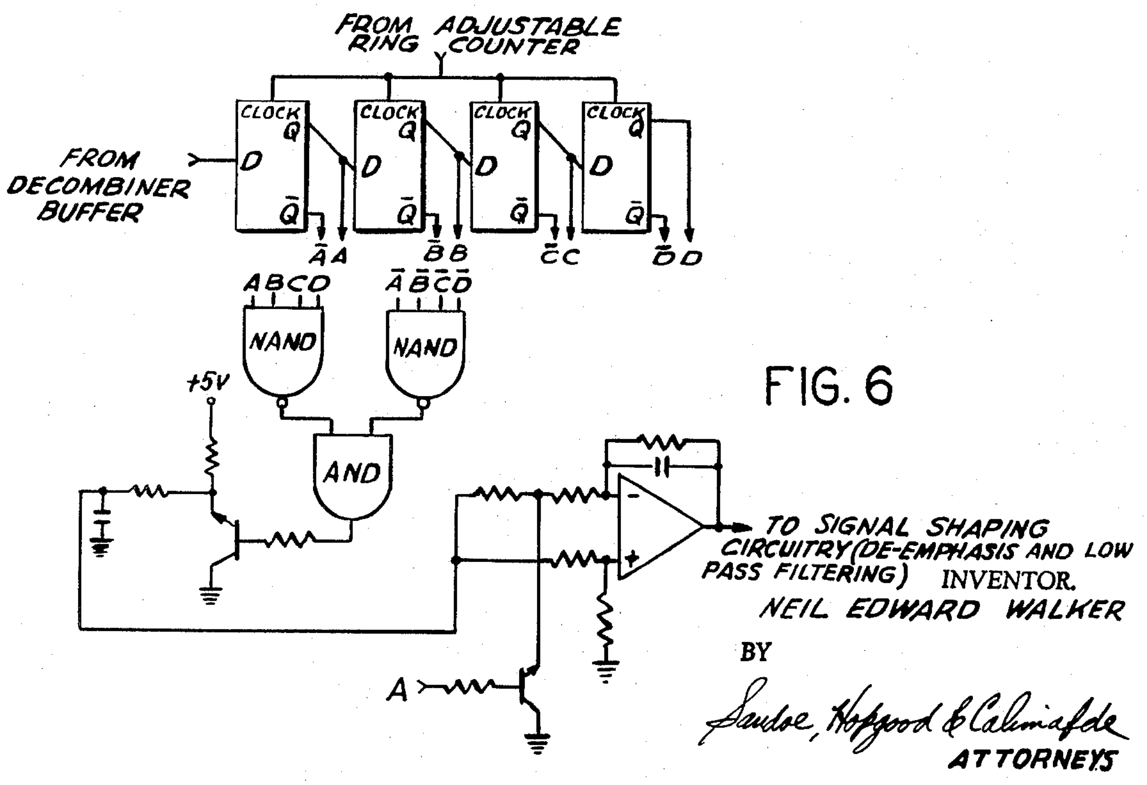
Figure 7:
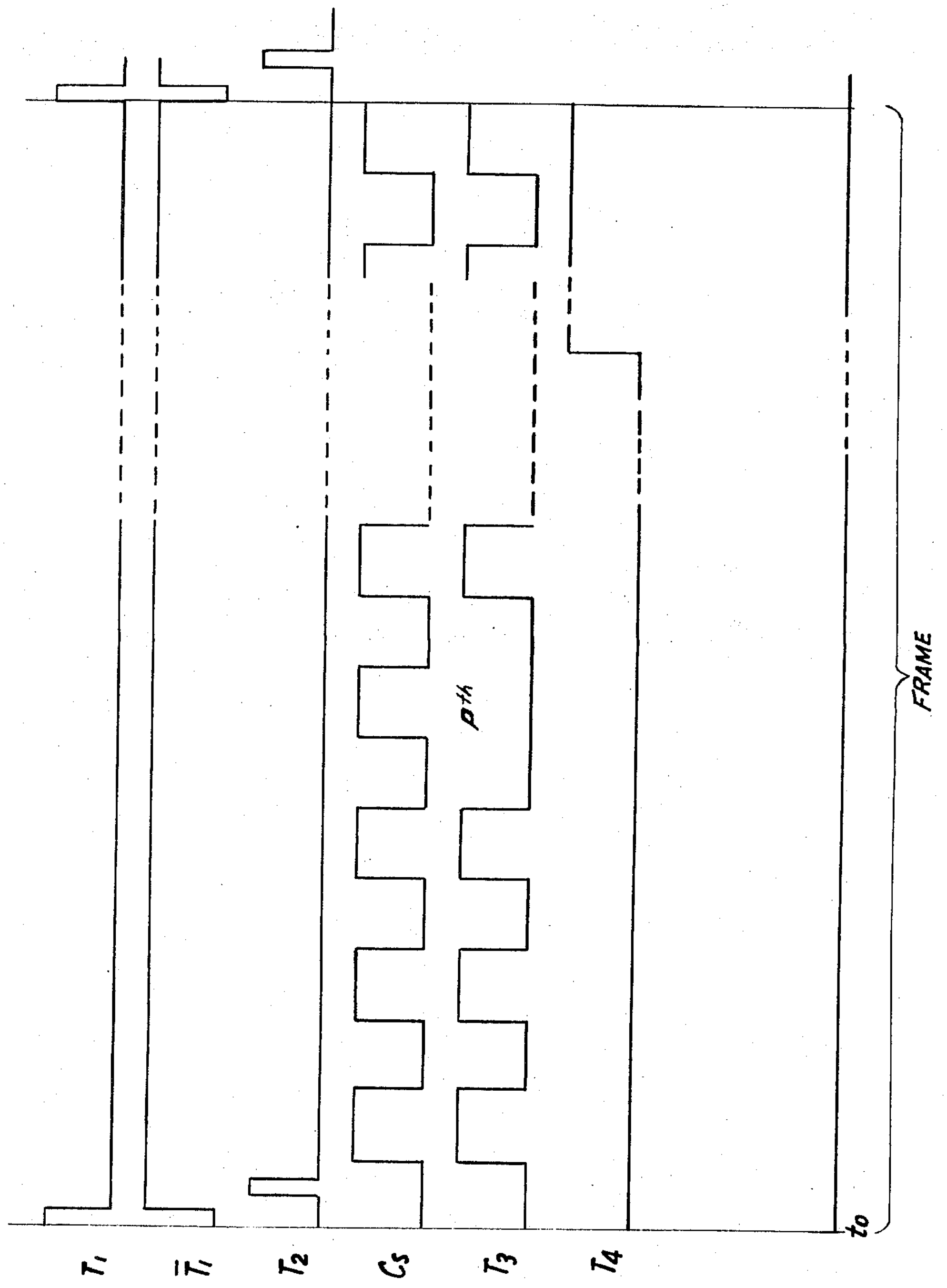

FIG. 6 schematically illustrates a digitally companded delta sigma demodulator for use in the receiver of FIG. 1*b;* and FIG. 7 shows the timing logic relationship T1, T2, T3, T4 and Cs of FIGS. 1*a* and 1*b*.

DETAILED DESCRIPTION OF THE INVENTION

In order to illustrate one embodiment of the invention, applicant has chosen specific circuitry predicated upon digitally companded delta sigma modulation techniques; however, it is to be understood and is so intended that the arrangements shown are merely exemplary of a preferred mode.

Turning now to the figures, in particular FIGS. 1*a* and 1*b*, speech sources 1 through N (not shown) are initially fed to respective signal shaping circuits 10I through 10N which function in the conventional manner to isolate intelligence in the desired frequency range by input pre-emphasis, amplitude limiting, and filtering. The output from the respective signal shaping circuits are fed to the analog to digital converters 20I through 20N. In the preferred embodiment, the analog to digital converters are delta sigma modulators of the digitally companded type controlled by clock pulses which appear at the respective converters from a plurality of storage means 30, each of which is capable of storing either of two binary states.

Figure 2:
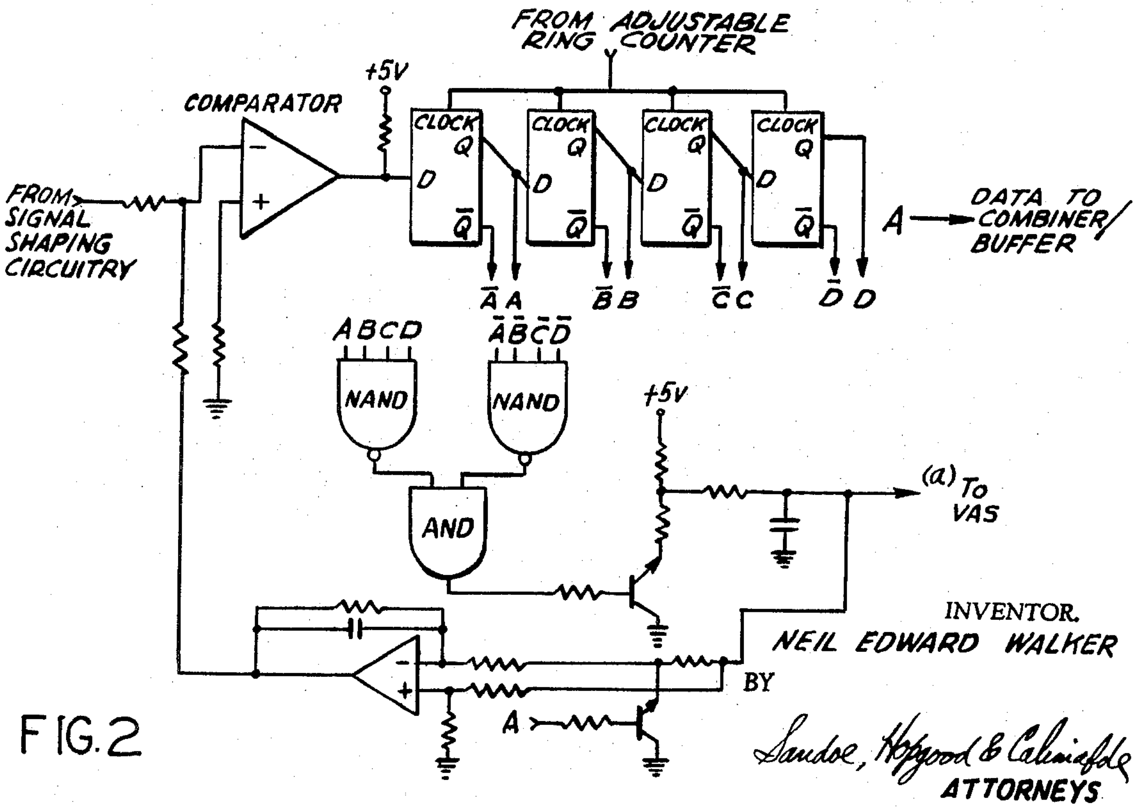
FIG. 2 is a block schematic diagram of a digitally companded delta sigma modulator which may be employed in the corresponding box in FIG. 1.
Figure 3:
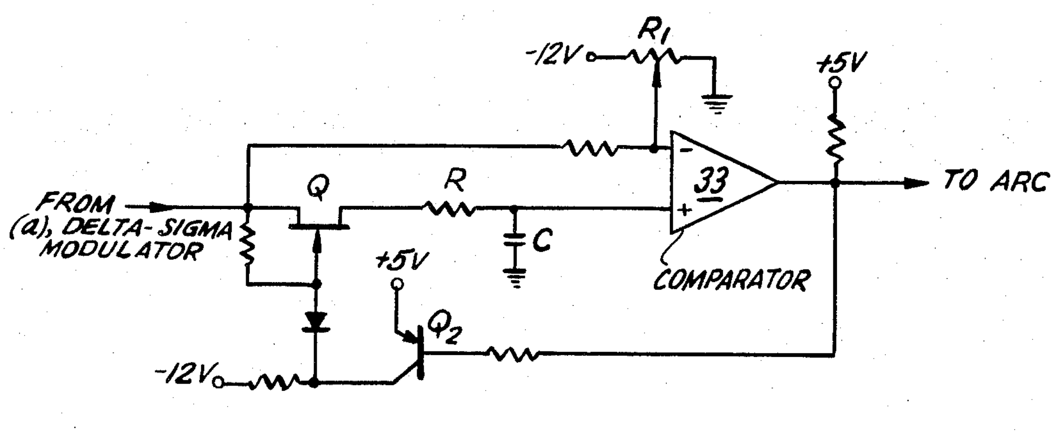
FIG. 3 is a block schematic diagram of a voice actuated switch for use in the invention.

In order to determine which speech sources are active, voice actuated switches 40I through 40N are connected to the respective converters. Thus, it may be seen that in this embodiment, rather than connecting the voice actuated switches for control directly by the incoming wave, advantage is taken of the companding loop of the delta sigma modulator. An example of such a modulator is shown in FIG. 2. FIG. 2 shows a delta sigma modulator having within it a voltage point $a$ which follows the average amplitude of the speech envelope. This voltage point is full-wave rectified, making it an ideal voltage to use in determining the presence or absence of a speech signal. Voltage point $a$ is used as a tap to feed a voice actuated switch, an example of which is shown in FIG. 3. This is a conventional switching arrangement having a pre-set threshold which is set via variable resistor $R_1$. Voltage (a) is fed to a switch consisting of transistors $Q_1$ and $Q_2$ and an RC filter. This type switch configuration has the inherent advantage of preventing the switch from remaining on due to imput noise alone. The output of a logic comparator 33 is arranged in the conventional manner to be low when voltage $a$ exceeds the pre-set threshold, thus indicating the appearance of a speech signal.

Figure 4:
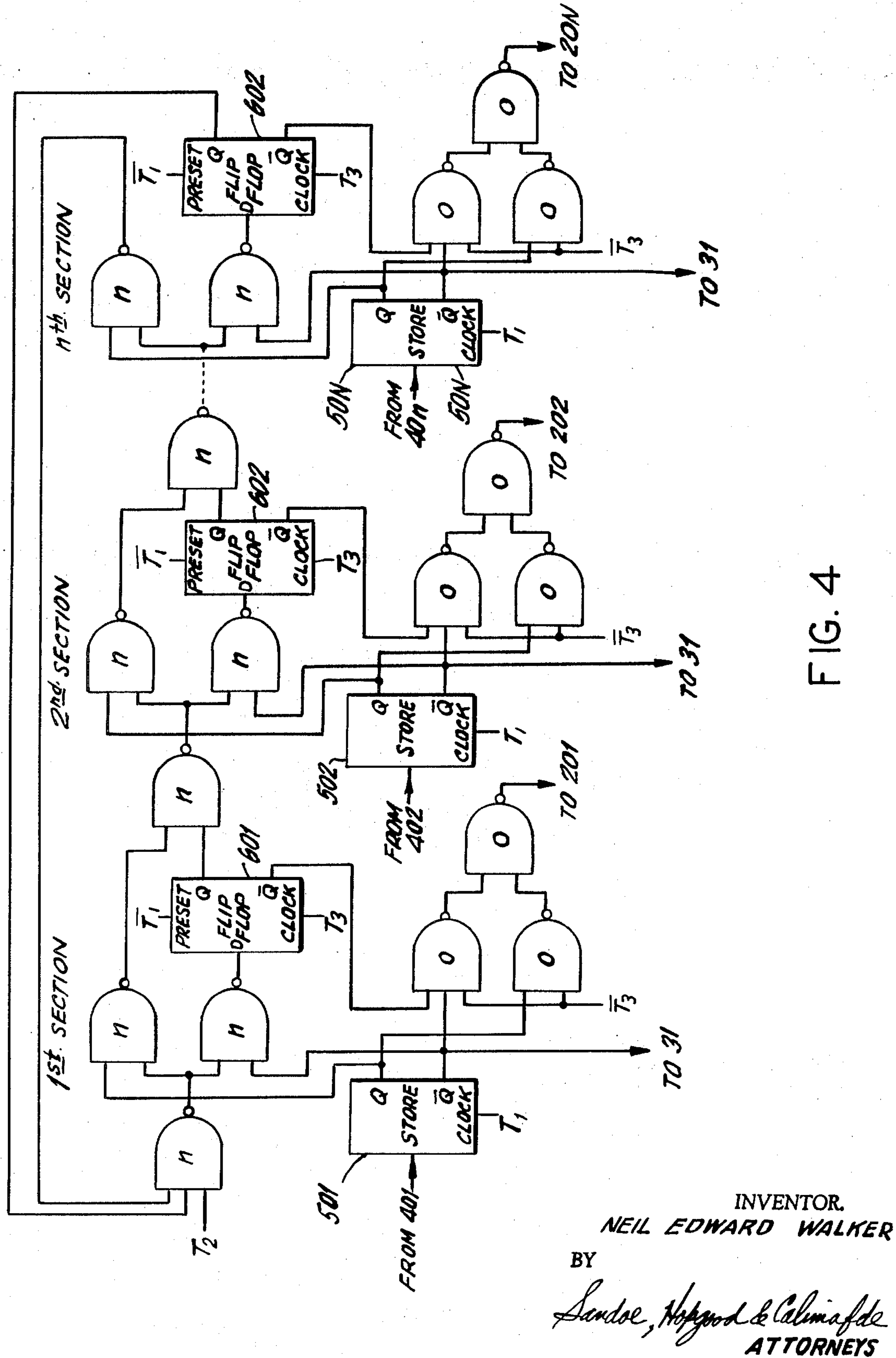
FIG. 4 illustrates in block schematic form an adjustable ring counter for use in the transmitter of FIG. 1*a;*

The voice actuated switch outputs (one for each converter), which may be termed logic outputs, feed the plurality of storage means 30. An example of such a storage means is shown in FIG. 4. Once each millisecond timing pulse $T_1$ gates the storage latches 50I through 50N to permit the information presented to them by the voice actuated switches 40I through 40N, respectively, to be stored. The primary output Q of the storage latches are utilized in a conventional manner by the NAND gates *n* to form a loop including flip-flops 60l through 60N which correspond to the active channels. The arrangement shown is arranged such that where a latch indicates an inactive channel, the corresponding flip-flop 60l through 60N is effectively removed from the ring configuration as may be seen from an examination of FIG. 4.

At the beginning of each millisecond, timing command $\overline{T}_1$ presets all of the flip-flops in the loops. Preferably at this time, timing pulse $T_2$ stuffs a "low" state into the first flip-flop, starting from 60l, whose latch indicates that the associated channel is active. Timing pulses $T_3$ thereupon follow, causing the inserted low state to cycle through the active flip-flop 60l. . . 60N stages. $T_3$ occurs at the system rate, except for a pulse detected every Pth bit time. This "missing" pulse is used in the buffer to accommodate format and sync information. The alternate output $\overline{Q}$ of the flip-flops permits the low state to activate gates "0" which enable, in the conventional manner, the clock pulses to be delivered to the associated active delta sigma modulators. Thus, the binary state of each flip-flop indicates the activity or inactivity of one source.

In order to ensure that the delta sigma modulators are ready to respond to speech signals, the latches 50l. . . 50N are so arranged that if a latch indicates that the associated delta sigma modulator is not receiving a speech signal, the modulator receives rate $\overline{T}_3$, as indicated, to keep it nulled approximately at ground.

Figure 5:
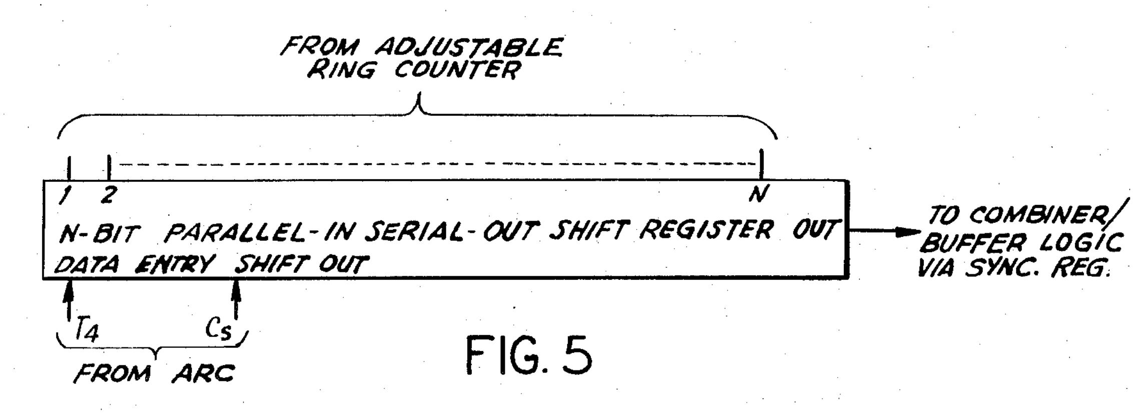
FIG. 5 is a detail of the format registers for use in the embodiment of FIGS. 1*a* and 1*b;*

The storage latches of the storage means 30 are also arranged to feed format register 31 shown in greater detail in FIG. 5. Format register 31 is a conventional module of the parallel to serial shift register type for accepting the activity information from storage means 30 upon command from the timing logic 35. The sync register 32 is another conventional module of the parallel to serial shift register type which, upon command from timing signals T4 and Cs accepts a hard-wired synchronization code to be used subsequently in the receiver for frame synchronization purposes. The format and sync data are clocked into the combiner buffer 33 upon further command from the timing logic circuit.

The combiner portion of the combiner/buffer 33 consists of conventional digital circuitry modules of a parallel to serial gating arrangement, wherein the data bits from the active modulators (A/D converters) are placed in time sequence in a serial data stream and subsequently fed to the buffer. The buffer consists of two registers, one in which the sequential data pulses are assembled, and another in which the format and sync data are assembled. These two blocks of data are clocked out of the system with preferably the sync and format data preceding the A/D converter data. This operation, which is the conventional economic method of converting data streams of one data arrangement into a data stream with a different data arrangement, shifts the interlaced pattern of A/D and format/sync data into a block pattern of data for transmission. The interlace pattern is initially necessary to maintain a reasonably even clocking pattern to the A/D converters, thereby maintaining good quality conversion. The format and sync data, accommodations for which have been made by use of the pth data bit of waveform T3 as described earlier, is preferably reshuffled via the buffer so that they occur in time before the A/D converter data. This operation, as will be appreciated by those skilled in the art, allows the receiver to utilize the format data to match itself to the active channel configuration of the transmitter prior to reception of the channel data. Timing logic circuit 35 is a conventional pulse forming circuit driven by the system clock 36. The relationship between its outputs T1, T2, T3, and T4 are shown in FIG. 7.

Inasmuch as the described system utilizes conventional components arranged to function inter se in accordance with the invention, but each functioning intra se in the conventional manner, the circuits have not been explained in detail but, rather where appropriate, exemplary members of the class under consideration are shown. Thus, for example, FIG. 2 illustrates the preferred means of converting the analog speech information into digital data; to wit, a digitally companded delta sigma modulator.

FIG. 1*b* illustrates, as will be appreciated by those skilled in the art, the inverse or receiver circuit for converting the interlaced properly sequenced digitally companded delta sigma signals back to analog. An example of a digitally companded delta sigma demodulator for use in the receiver is shown in FIG. 6. As will be appreciated, the VRAM receiver operates inversely as the transmitter, the sequential interlaced signals being decombined and stored in the buffer 40 and being transmitted to the demodulators 70l. . . 70N (in this case, digital to analog converters) where they are forwarded to the signal shaping circuits 80l. . . 80N under control of the storage means 30' and format register 31'. The means for properly sequencing events in both the transmitter and receiver consist of the System Clock, Timing Logic, and combiner (or decombiner)-/buffer. This circuitry consists of conventional counters, decoders, and shift registers.

It will also be appreciated by those skilled in the art that it is necessary to lock the transmitter and receiver onto a standard time base. The circuitry for so doing consists of conventional synchronization circuitry for both the frames and the bits, disposed in circuit, as shown in FIG. 1*b*.

The bit synchronizer 39 recovers the system clock rate Cs from the incoming data stream. Such circuitry is conventionally implemented through the use of standard phaselock loop techniques. The frame synchronizer 38 is composed of conventional digital comparator circuitry. When the synchronization code word sent by the transmitter passes through the frame synchronizer, the digital comparator indicates the presence of the sync word by sending a pulse to the timing logic which locks the receiver onto the proper time base. Should the frame synchronizer, after sampling a particular time slot for a suitable length of time, not find the synchronization code word, it shifts its sample time by one bit period, thereby effecting a scanning of the data stream which permits the frame synchronizer to seek out and lock onto the sync code word. In addition, the frame synchronizer 38 conventionally contains additional digital circuitry to guard against false synchronization (locking on random data which happens to look like the sync code word) and also circuitry to guard against false loss of sync (loss of sync due to noise interfering with the sync code word identity).

FIG. 7 illustrates the forms and relative timing. It may be seen that T3 is the same as Cs except that every Pth pulse is removed to accommodate the format and sync data. T4 may be seen to be a dual level pulse; when low T4 permits activity data to be entered into the format register, when high T4 allows the data to be shifted into the data register of the combiner/buffer.

In a typical operation, each user would have his speech converted into a digital format by the digitally companded delta sigma modulator associated with that speech source. As mentioned, the delta sigma modulator sample rate is capable of being changed rapidly and the quality of speech conversion will track the sample rate; the higher the sample rate, the higher the quality. Thus, for example, if the sample rate is 20kbs, alternating each millisecond with a 40kbs rate, the average sample rate would be 30kbs. The resulting quality which the human ear would perceive would be approximately equal to the quality received from a modulator at a constant 30kbs. This would only be approximate since the modulator's quality is not a pure linear function of the sample rate.

Assuming there were four talkers on average, the average sample rate for any of the modulators would be approximately equal to the total data rate (which is a function of the driving pulses applied to the storage means 30) divided by four. Thus, for example, if the total data rate were 120kbs, then the average sample rate for the modulators would be 30kbs (120 divided by 4).

The in-use channels are determined by the signal sensing circuitry at one millisecond intervals. To enable the receiver to follow the sampling action of the transmitter, the in-use information which is obtained each millisecond is also transmitted each millisecond. The in-use information would consist of a format bit for each channel plus any coding which may be necessary, depending upon the error environment. The format bits signify the status of each channel (for example, 1 is in use, 0 is not in use). Therefore, *n* format bits are sent every millisecond plus the encoding bits. In addition, S synchronization bits would be transmitted each millisecond. Assuming that five encoding bits will suffice for a ten channel system and that five bits is sufficient for synchronization purposes, then the total output bit rate is the total data rate plus the format bit rate plus the encoding bit rate plus the synchronization rate, or 120kbs + 10kbs + 5kbs + 5kbs, which equals 140kbs.

Dividing the total rate of 140kbs by the number of channels, an average rate of 14kbs is obtained for each channel. It will be appreciated, however, that each channel provides a quality roughly equivalent to that provided by a companded delta sigma modulator running at a constant rate of 30kbs. It can further be seen that at no time will the instantaneous sample rate for a channel drop below 120/10kbs or 12kbs and, therefore, there will be no freeze-out or absolute data loss.

While the principles of the invention have been described in connection with specific apparatus, it is to be clearly understood that this description is made only by way of example and not as a limitation to the scope of the invention.

What is claimed is:

1. A variable rate speech multiplexing transmitter in which time slots occurring at a fixed predetermined rate are allocated among a constantly changing number of active speech courses comprising:

a plurality of speech sources each presenting an analog speech signal when in an active state, each source including means for shaping the analog original;

a plurality of converter means each associated with a particular speech source for converting the analog signal received therefrom to a digitally companded delta sigma modulated signal, each converter means including a companding loop and a tap connected to the loop which presents a full wave rectified signal that follows the average amplitude of the analog speech signal converted therein;

a plurality of voice actuated switch means each connected to the tap of one of the converter means to receive a signal therefrom and indicating the active or inactive state of the speech source associated with that converter means, said active or inactive state being determined with reference to a preselected threshold noise level;

a plurality of bi-stable storage latch means each connected to a particular voice actuated switch means, the storage latch means being interconnected to form a loop;

gating means for periodically supplying timing pulses to the storage latch means and thereby resetting each storage latch means to indicate the active or inactive state of the connected speech source; and register means for combining digitized speech signals received from said converter means to form a data stream including digitized time division signals from only those converter means associated with speech sources that the storage latch means indicates are active, the register means thus providing an output in which the rate at which any active speech source is sampled varies and is dependent upon the number of other simultaneously active speech sources in the system.

2. The apparatus of claim 1 further comprising synchronizing means responsive to the storage latch means for generating channel identifying information identifying time slots corresponding to particular speech sources and for supplying current channel identifying information to said register means at fixed and predetermined intervals.

3. The apparatus of claim 2, wherein said synchronizing means generates identifying information that identifies time slots associated with particular channels without reference to previously generated identifying information.

4. A variable rate speech multiplexing transmitter in which time slots occurring at a fixed predetermined rate are allocated among a constantly changing number of active speech sources comprising:

a plurality of speech sources each presenting an analog speech signal when in an active state, each speech source including means for shaping the analog signal and means for preemphasizing the analog signal;

a plurality of converter means each associated with a particular speech source for converting the analog signal from that source to a digitized speech signal;

a plurality of voice actuated switch means each associated with a particular speech source for indicating the active or inactive state thereof determined with reference to a preselected threshold noise level;

a plurality of bi-stable storage latch means each connected to a particular voice actuated switch means, the storage latch means being interconnected to form a loop;

gating means for periodically supplying timing pulses to the storage latch means and thereby resetting each storage latch means to indicate the active or inactive state of the connected speech source;

synchronizing means responsive to said storage latch means for generating channel identifying information identifying time slots corresponding to particular speech sources without reference to previously transmitted identifying information and for supplying said channel identifying information to the register means at fixed and predetermined intervals; and register means for combining digitized speech signals received from the converter means to form a data stream including digitized time division signals from only those converter means associated with speech sources that the storage latch means indicates are active and for interleaving with said digitized speech signals at fixed and predetermined intervals the identifying information received from the synchronizing means, thereby providing an output wherein the rate at which any active speech source is sampled varies and is dependent upon the number of other simultaneously active speech sources in the system.

* * * * *

UNITED STATES PATENT OFFICE
CERTIFICATE OF CORRECTION

Patent No. 3,864,524 Dated February 4, 1975

Inventor(s) E. WALKER

It is certified that error appears in the above-identified patent and that said Letters Patent are hereby corrected as shown below:

CLAIM 1, line 65, column 1, "courses" should be

--sources--.

Signed and sealed this 15th day of April 1975.

(SEAL)
Attest:

RUTH C. MASON
Attesting Officer

C. MARSHALL DANN
Commissioner of Patents
and Trademarks